US012689620B2

(12) United States Patent
Vedula et al.

(10) Patent No.: US 12,689,620 B2
(45) Date of Patent: Jul. 21, 2026

(54) SYSTEMS AND METHODS FOR DATA STORAGE

(71) Applicant: Apple Inc., Cupertino, CA (US)

(72) Inventors: Srinivas Vedula, Pleasanton, CA (US); David Cohen, Longmont, CO (US)

(73) Assignee: Apple Inc., Cupertino, CA (US)

( * ) Notice: Subject to any disclaimer, the term of this patent is extended or adjusted under 35 U.S.C. 154(b) by 173 days.

(21) Appl. No.: 18/353,038

(22) Filed: Jul. 14, 2023

(65) Prior Publication Data

US 2024/0223553 A1 Jul. 4, 2024

Related U.S. Application Data

(60) Provisional application No. 63/477,812, filed on Dec. 29, 2022.

(51) Int. Cl.
*H04L 9/40* (2022.01)
*G06F 21/10* (2013.01)

(52) U.S. Cl.
CPC .......... *H04L 63/083* (2013.01); *G06F 21/101* (2023.08); *H04L 63/04* (2013.01); *H04L 63/0435* (2013.01)

(58) Field of Classification Search
CPC ... H04L 63/083; H04L 63/04; H04L 63/0435; G06F 21/101
See application file for complete search history.

(56) References Cited

U.S. PATENT DOCUMENTS 7,725,716 B2 5/2010 Tidwell et al.
9,137,014 B2 9/2015 Herbach et al.
(Continued)

FOREIGN PATENT DOCUMENTS

CN 111385627 B 12/2022
KR 102668753 B1 5/2024
(Continued)

OTHER PUBLICATIONS

Zhou et al, Development and Research of Root File System Based on Cortex-A8 Microprocessor, Aug. 2018, Atlantis Press, Proceedings of the 2018 International Conference on Information Technology and Management Engineering (ICITME 2018), Table 1. (Year: 2018).*

(Continued)

*Primary Examiner* — Catherine Thiaw
*Assistant Examiner* — Nega Woldemariam
(74) *Attorney, Agent, or Firm* — Kubota & Basol LLP

(57) ABSTRACT

A plurality of devices in a system discover one another and a first electronic device selects a second electronic device from amongst a plurality of devices to coordinate file storage. In some embodiments, the first electronic device and the second electronic device perform an authentication handshake. After performing the authentication handshake, the first electronic device transmits first data to the second electronic device. In some embodiments, the second electronic device operates using a temporary file system that includes the first data. In accordance with a determination that one or more criteria are satisfied, the second electronic device ceases operating using the temporary file system and deletes at least a portion of the temporary file system and/or first data.

20 Claims, 5 Drawing Sheets

(56) References Cited

U.S. PATENT DOCUMENTS

| | | | |
|---|---|---|---|
| 9,740,832 B2 | 8/2017 | Shi | |
| 9,977,496 B2 | 5/2018 | Maltz | |
| 10,509,463 B2 | 12/2019 | Cuervo et al. | |
| 10,698,743 B2 | 6/2020 | Studnicka | |
| 10,783,269 B1 | 9/2020 | Shraer et al. | |
| 11,177,836 B1 | 11/2021 | Thantharate et al. | |
| 11,334,157 B1 | 5/2022 | Gong et al. | |
| 11,348,369 B2 | 5/2022 | Wu et al. | |
| 11,678,016 B1 | 6/2023 | Antony et al. | |
| 11,884,235 B2 | 1/2024 | Bielby | |
| 12,058,301 B2 | 8/2024 | Jansen Dos Reis | |
| 2007/0220009 A1 | 9/2007 | Morris et al. | |
| 2008/0184352 A1* | 7/2008 | Nishiguchi | G06F 21/32 |
| | | | 726/7 |
| 2010/0214243 A1 | 8/2010 | Birnbaum et al. | |
| 2011/0276803 A1 | 11/2011 | Bender et al. | |
| 2013/0305354 A1 | 11/2013 | King et al. | |
| 2014/0089278 A1 | 3/2014 | Lovinger et al. | |
| 2014/0250518 A1* | 9/2014 | Schneider | G06F 21/34 |
| | | | 726/9 |
| 2014/0283012 A1 | 9/2014 | Eggerton et al. | |
| 2015/0079933 A1 | 3/2015 | Smith et al. | |
| 2015/0113631 A1 | 4/2015 | Lerner et al. | |
| 2015/0193982 A1 | 7/2015 | Mihelich et al. | |
| 2016/0028708 A1* | 1/2016 | Guthery | H04L 63/20 |
| | | | 726/1 |
| 2016/0103998 A1 | 4/2016 | Tredoux et al. | |
| 2016/0173499 A1 | 6/2016 | Bianchi et al. | |
| 2016/0232336 A1 | 8/2016 | Pitschel et al. | |
| 2017/0146350 A1* | 5/2017 | Beaurepaire | H04W 4/029 |
| 2017/0277876 A1 | 9/2017 | Alameh et al. | |
| 2017/0324729 A1* | 11/2017 | Hon | H04L 63/083 |
| 2017/0346851 A1* | 11/2017 | Drake | H04L 9/0838 |
| 2018/0088795 A1 | 3/2018 | Van Os et al. | |
| 2018/0262503 A1* | 9/2018 | Dawson | H04L 9/3239 |
| 2018/0288030 A1 | 10/2018 | Witrisna et al. | |
| 2018/0293249 A1 | 10/2018 | Tabares | |
| 2018/0324186 A1* | 11/2018 | Dintenfass | G06F 21/31 |
| 2019/0065679 A1* | 2/2019 | Powers | H04L 63/083 |
| 2019/0147662 A1 | 5/2019 | Nicholas et al. | |
| 2019/0158593 A1* | 5/2019 | Sloane | H04L 63/083 |
| 2019/0319932 A1 | 10/2019 | Kandregula | |
| 2020/0021567 A1 | 1/2020 | Salgaonkar et al. | |
| 2020/0106762 A1* | 4/2020 | VanBlon | H04L 63/0846 |
| 2020/0136826 A1* | 4/2020 | Sharma | H04L 63/08 |
| 2020/0367054 A1 | 11/2020 | Obaidi | |
| 2020/0389460 A1 | 12/2020 | Carbune et al. | |
| 2021/0034725 A1 | 2/2021 | Donley et al. | |
| 2021/0045169 A1 | 2/2021 | Pupakdee et al. | |
| 2021/0109836 A1 | 4/2021 | Cranfill et al. | |
| 2021/0203747 A1* | 7/2021 | Gorsica, IV | H04L 67/143 |
| 2021/0204115 A1 | 7/2021 | Gorsica et al. | |
| 2022/0237148 A1 | 7/2022 | Perlman et al. | |
| 2022/0269333 A1 | 8/2022 | Dedonato et al. | |
| 2022/0377060 A1* | 11/2022 | Livny | H04L 63/068 |
| 2024/0012932 A1* | 1/2024 | Qiao | G06F 21/6245 |
| 2024/0061547 A1 | 2/2024 | Fleizach et al. | |
| 2024/0094528 A1 | 3/2024 | Edwin et al. | |
| 2024/0220145 A1 | 7/2024 | Vedula | |
| 2024/0281235 A1 | 8/2024 | Huang et al. | |
| 2024/0323340 A1 | 9/2024 | Cohen et al. | |
| 2024/0330491 A1 | 10/2024 | Mittal et al. | |
| 2024/0330498 A1 | 10/2024 | Cohen et al. | |
| 2024/0333719 A1 | 10/2024 | Cohen | |

FOREIGN PATENT DOCUMENTS

| | | |
|---|---|---|
| WO | 2016000098 A1 | 1/2016 |
| WO | 2018059934 A1 | 4/2018 |

OTHER PUBLICATIONS

Yao et al., Development and Research of Root File System Based on Cortex-A8 Microprocessor, 2018, All (Year: 2018).*

Deng et al., "Edge Intelligence: the Confluence of Edge Computing and Artificial Intelligence", IEEE Internet of Things Journal, vol. 7, No. 8, Aug. 2020, pp. 7457-7469.

Du et al., "MEC-Assisted Immersive VR Video Streaming over Terahertz Wireless Networks: a Deep Reinforcement Learning Approach", IEEE Internet of Things Journal, vol. 7, No. 10, Oct. 2020, pp. 9517-9529.

Garriss et al., "Trustworthy and Personalized Computing on Public Kiosks", MobiSys'08, Breckenridge, Colorado, USA, Jun. 17-20, 2008, pp. 199-210.

Li, Yong, "Enhancing Mobile Capacity through Generic and Effcient Resource Sharing", TRACE: Tennessee Research and Creative Exchange, Doctoral Dissertations, Dec. 2018, 112 pages.

Liu et al., "Cutting the Cord: Designing a High-quality Untethered VR System with Low Latency Remote Rendering", MobiSys'18, Munich, Germany, Jun. 10-15, 2018, pp. 68-80.

Microsoft, "Lock Your Windows PC Automatically When You Step Away From It", Available online at: <https://support.microsoft.com/en-us/windows/lock-your-windows-pc-automatically-when-you-step-away-from-it-d0a5f536-74ac-0859-820a-4140dac9fcaf>, [retrieved on Mar. 28, 2024], 3 pages.

International Search Report received for PCT Patent Application No. PCT/US2024/020606, mailed on Jun. 13, 2024, 5 pages.

Non-Final Office Action received for U.S. Appl. No. 18/397,902, mailed on Mar. 14, 2025, 55 pages.

MicrosoftA® Computer Dictionary, Fifth Edition, accessed via Google search on wordpress.com, 2002, pp. 154, 470.

Extended European Search Report received for European Patent Application No. 24166984.5, mailed on Aug. 12, 2024, 8 pages.

Extended European Search Report received for European Patent Application No. 24167059.5, mailed on Aug. 12, 2024, 8 pages.

International Search Report received for PCT Patent Application No. PCT/US2023/086084, mailed on Mar. 20, 2024, 4 pages.

International Search Report received for PCT Patent Application No. PCT/US2023/086401, mailed on Apr. 26, 2024, 4 pages.

Apple, "Approve What Kids Buy With Ask to Buy", Apple Support, Available online at <https://support.apple.com/en-us/HT201089>, [Retrieved from Internet on Aug. 20, 2024], 6 pages.

Apple, "Set up Family Sharing", Apple Support, Available online at <https://support.apple.com/en-us/HT201088>, [Retrieved from Internet on Aug. 20, 2024], 6 pages.

Pattison, Sandra, "How to Put Parental Controls on iPhone and iPad in 2024", Cloudwards, Available online at <https://www.cloudwards.net/parent-controls-on-iphone/#:~:text=Can%201%20Control%20My%20Child%27s,for%20your%20child%27s%20iOS%20device>, [Retrieved from Internet on Aug. 20, 2024], 35 pages.

Non-Final Office Action received for U.S. Appl. No. 18/611,432, mailed on Sep. 23, 2025, 12 pages.

Non-Final Office Action received for U.S. Appl. No. 18/610,159, mailed on Sep. 16, 2025, 13 pages.

Non-Final Office Action received for U.S. Appl. No. 18/611,444, mailed on Jul. 23, 2025, 6 pages.

Final Office Action received for U.S. Appl. No. 18/397,902, mailed on Dec. 2, 2025, 62 pages.

Non-Final Office Action received for U.S. Appl. No. 18/611,431, mailed on Aug. 8, 2025, 8 pages.

Notice of Allowance received for U.S. Appl. No. 18/611,444, mailed on Nov. 4, 2025, 8 pages.

* cited by examiner

200

DISCOVER DEVICES — 205

SELECT DEVICE — 210

PERFORM AUTHENTICATION HANDSHAKE — 215

TRANSFER/RECEIVE DATA — 220

CREATE TEMPORARY FILE SYSTEM — 225

OPERATE USING A TEMPORARY FILE SYSTEM — 230

DELETE TEMPORARY FILE SYSTEM — 235

400

PERFORM AN AUTHENTICATION HANDSHAKE — 402

TRANSMIT DATA — 404

TRANSMIT INSTRUCTIONS TO DELETE AT LEAST A PORTION OF THE TEMPORARY FILE SYSTEM AND CEASE ACCESSING THE DATA — 406

300

PERFORM AN AUTHENTICATION HANDSHAKE — 302

RECEIVE DATA — 304

OPERATE USING A TEMPORARY FILE SYSTEM — 306

DELETE AT LEAST A PORTION OF THE TEMPORARY FILE SYSTEM AND CEASE TO ACCESS THE DATA — 308

SYSTEMS AND METHODS FOR DATA STORAGE

CROSS-REFERENCE TO RELATED APPLICATIONS

This application claims the benefit of U.S. Provisional Application No. 63/477,812, filed Dec. 29, 2022, the content of which is incorporated herein by reference in its entirety for all purposes.

FIELD OF THE DISCLOSURE

Aspects of the present disclosure relate to systems and methods for operating with a temporary file system including data received from another device.

BACKGROUND OF THE DISCLOSURE

Electronic devices may store data in file systems. In some situations, the data can be received from another electronic device.

SUMMARY OF THE DISCLOSURE

Aspects of the present disclosure relate to systems and methods for operating with a temporary file system including data received from another device. In some embodiments, a plurality of devices in a system discover one another, and a first electronic device selects a second electronic device from amongst a plurality of devices to coordinate file storage. In some embodiments, the first electronic device and the second electronic device perform an authentication handshake. In some embodiments, after performing the authentication handshake with the second electronic device, the first electronic device transmits first data to the second electronic device. In some embodiments, in response to receiving the first data from the first electronic device, the second electronic device creates a temporary file system that is secure and separate from an existing file system on the second electronic device. In some embodiments, the second electronic device operates using the temporary file system that includes the first data. For example, the user of the first electronic device uses the second electronic device to access the temporary file system. In some embodiments, in accordance with a determination that one or more criteria are satisfied (e.g., at the conclusion of the usage of the second electronic device by the user of the first electronic device), the second electronic device ceases operating using the temporary file system and deletes the temporary file system and/or first data.

BRIEF DESCRIPTION OF THE DRAWINGS

For a better understanding of the various described embodiments, reference should be made to the Detailed Description below, in conjunction with the following drawings in which like reference numerals often refer to corresponding parts throughout the figures.

DETAILED DESCRIPTION

Aspects of the present disclosure relate to systems and methods for operating with a temporary file system including data received from another device. In some embodiments, a plurality of devices in a system discover one another and a first electronic device selects a second electronic device from amongst a plurality of devices to coordinate file storage. In some embodiments, the first electronic device and the second electronic device perform an authentication handshake. In some embodiments, after performing the authentication handshake with the second electronic device, the first electronic device transmits first data to the second electronic device. In some embodiments, in response to receiving the first data from the first electronic device, the second electronic device creates a temporary file system that is secure and separate from an existing file system on the second electronic device. In some embodiments, the second electronic device operates using the temporary file system that includes the first data. For example, the user of the first electronic device uses the second electronic device to access the temporary file system in a guest access session. In some embodiments, in accordance with a determination that one or more criteria are satisfied (e.g., at the conclusion of the usage of the second electronic device by the user of the first electronic device), the second electronic device ceases operating using the temporary file system and deletes the temporary file system and/or first data.

Figure 1:
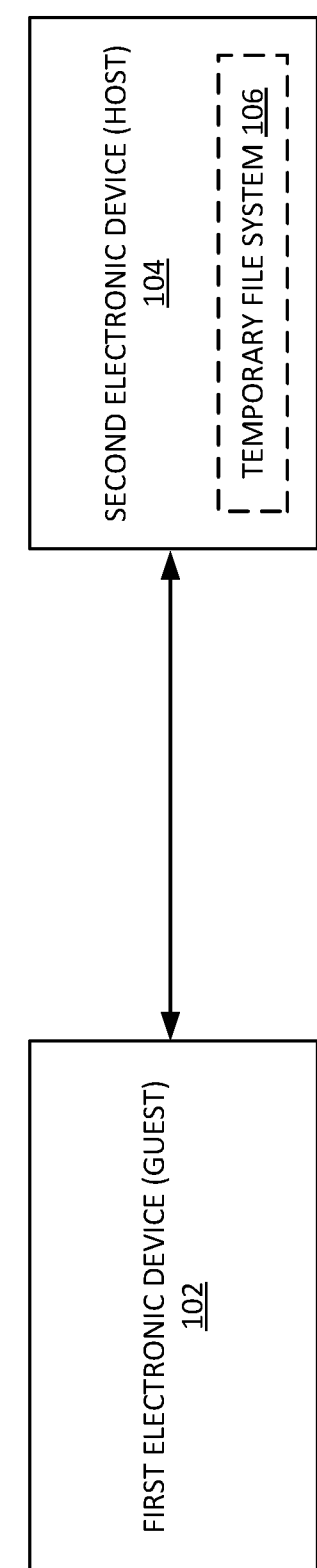
FIG. 1 is a block diagram of a system including a first electronic device and a second electronic device according to some embodiments of the disclosure.

FIG. 1 is an example block diagram of a system 100 including a first electronic device 102 and a second electronic device 104 according to some embodiments of the disclosure. As described herein, the second electronic device 104 (also referred to as a "host" device) can host and operate with a temporary file system 106 that includes data from the first electronic device 102 (also referred to as a "guest" device). Example electronic devices include smart phones, portable media players, tablet computers, laptop computers, desktop computers, wearable devices or any other suitable portable or non-portable electronic device. In some embodiments, the first electronic device is a smartphone or tablet computer and the second electronic device is a desktop or laptop computer. The temporary file system can include data from the smartphone or tablet computer accessible when the user of the first electronic device has a session on the second electronic device. In some embodiments, the first electronic device is a smartphone and the second electronic device is a wearable device (e.g., a head-mounted display system). The temporary file system can include data (e.g., configuration data, user profiles, etc. for the second electronic device) from the smartphone accessible when the user of the first electronic device has a session on the second electronic device.

Figure 2A:
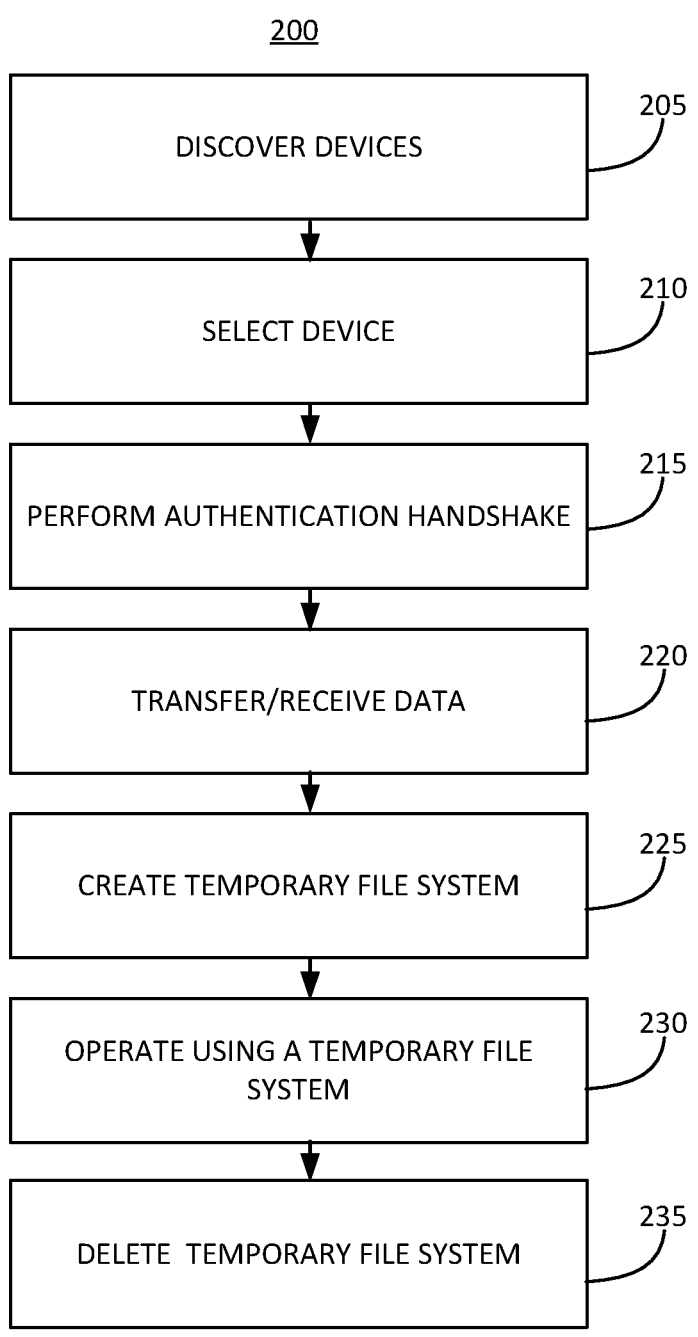
FIG. 2A is a block diagram illustrating an example method performed by one or more electronic devices in accordance with some embodiments of the disclosure.

FIG. 2A is a block diagram illustrating an example method performed by one or more electronic devices in accordance with some embodiments of the disclosure. In some embodiments, method 200 is performed at a system including the first electronic device 102 and second electronic device 104 (e.g., corresponding to system 100 in FIG. 1). The first electronic device 102 and the second electronic device 104 are in communication with each other using one or more communication protocols. In some embodiments, the first electronic device 102 and the second electronic device 104 utilize direct communication (e.g., single-hop, peer-to-peer communication) without communicating through a server or other third electronic device. Direct communication can improve the speed and security of communication between the first electronic device 102 and the second electronic device 104. In some embodiments, the first electronic device 102 and/or the second electronic device 104 change the type(s) of communication protocols used at various blocks of method 200.

Referring to FIG. 2A, at block 205, some or all of the electronic devices in the system discover one another as being within communications range. Discovery can occur through various techniques, such as polling and/or broadcast. In some embodiments, the first electronic device 102 sends network traffic seeking responses from other devices. The traffic produced by first electronic device 102 represents request(s) for file storage services. One or more of the other devices within communications range can provide, responsive to the request, responses indicating the availability of file services if they are configured to provide the requested services. In some embodiments, the second electronic device 104 sends network traffic indicating its characteristics and capabilities as related to file storage to the devices. The requests and responses sent by relevant devices can include characteristics and capabilities desired by a first electronic device and/or supported by a second electronic device. For example, the characteristics and capabilities include information such as the device name, model, guest user settings, storage availability, communications bandwidth, and/or computing capabilities of the device.

Devices that are communicating file storage characteristics and capabilities can do so based on their configuration, including settings that indicate whether their users (e.g., administrators) have agreed to provide file storage services for other devices. In some embodiments, second electronic device 104 implements an access control scheme where its administrator can selectively allow all, some (e.g., known contacts), or none of the other devices within communications range to utilize second electronic device 104 for temporary file storage. In some embodiments, second electronic device 104 is configured to prompt for user acceptance of any incoming file storage requests. In some embodiments, temporary file storage permissions are also associated with guest user settings of the second electronic device 104. For example, if second electronic device 104 permits sign-on from guest accounts, the device may indicate that it is available to temporary store files that are associated with a guest user of the device, such that devices owned by the user (e.g., first electronic device 102) can transmit data for temporary storage onto second electronic device 104, thereby enabling local access of the user's files on second electronic device 104 while they are using second electronic device 104 as a guest. It is noted that from the perspective of the second electronic device, the above-described features generally require that a user, such as an administrator, of the second electronic device to opt-in before relevant first electronic device(s) are permitted to utilize its storage capabilities. If the settings of the second electronic device 104 prevents the first electronic device 102 from transferring files to the second electronic device 104, the first electronic device 102 is not able to transfer files to the second electronic device 104.

Technology implementors are reminded that sharing data between electronic devices should be performed in accordance with privacy practices meeting or exceeding applicable laws and/or industry standards. These privacy practices may include, but are not limited to, requiring user permission to share the data and/or permitting the user to opt-out of data sharing. Robust encryption and data anonymization can also be employed to further secure shared data.

In some embodiments, one or more devices in the system 100 poll other devices in the system 100 during discovery. For example, the first electronic device 102 polls the other devices, including the second electronic device 104, to request an indication of the characteristics and capabilities related to file storage of the other devices. In some embodiments, the second electronic device 104 does not transmit the indication of its characteristics and capabilities related to file storage until polled by another device (e.g., the first electronic device 102).

In some embodiments, one or more of the electronic devices in the system broadcasts their characteristics and capabilities related to file storage as a background task while performing other operations. In some embodiments, one or more of the electronic devices in the system broadcast their characteristics and capabilities related to file storage while in a sleep or standby state. In some embodiments, one or more of the electronic devices in the system broadcast their characteristics and capabilities related to file storage in response to receiving a user input corresponding to a request to initiate file storage or to initiate guest usage of the device, such as a request to initiate a guest session. In some embodiments, broadcasting (e.g., by the second electronic device 104) and polling (e.g., by the first electronic device 102) occur at least partially simultaneously.

At block 210, the first electronic device 102 selects second electronic device 104 as the device to send data for use by a temporary user of the second electronic device 104 (e.g., the user associated with first electronic device 102 is a guest user of the second electronic device 104). The selection of second electronic device 104 as the target can depend on various factors. The first electronic device 102 optionally receives signals indicating the characteristics and capabilities described above of multiple electronic devices and selects the second electronic device 104 based on one or more ranked and/or weighted criteria, such as selecting devices with higher performance and/or that have been used by the user of the first electronic device 102 in the past over devices with lower performance and/or that have not been used by the user of the first electronic device 102 in the past. For example, a second electronic device having a faster networking communication bandwidth and/or more available storage space can be preferable to an alternative device on the network that has less space and/or less communications bandwidth. For example, a second electronic device that is frequently used or most recently used by first electronic device 102 may be preferable to other devices on the network.

In some examples, second electronic device 104 is aware of a particular user log-in, such as an access of the computer using a guest user account. In instances where the guest user who is using the second electronic device 104 also owns a nearby device (that is within communications range and can act as a first electronic device 102), it may be preferable for the files that are stored on the user's device 102 to become accessible temporarily on second electronic device 104 where the user is a guest. In these examples, electronic devices 102 and 104 may select one another based on an understanding of the user's credentials, such as username. In some examples, the first electronic device 102 detects physical proximity with a second electronic device 104 and select the second electronic device for storage. For example, first electronic device 102 may detect second electronic device 104 using near-field communication (NFC) or ultra-wide-band positioning (UWB). First electronic device 102 may select a second electronic device that is within a threshold distance, such as 1 cm, 5 cm, 10 cm, 50 cm, and so forth. Optionally, device selection can include a prompt for user input. In some embodiments, the first electronic device 102 presents a user interface indicating a plurality of devices available for temporary file storage and receives an input corresponding to the user selecting one of the available devices. In some embodiments, second electronic device 104 presents a user interface indicating nearby devices from which files can be transferred. Such a user interface may be presented during the log-in process, such that, as an example, a guest who is logging into first electronic device 102 is presented with a listing of their own nearby devices (such as the guest's personal smart phone) from which files may be transferred. In some embodiments, sensors in first electronic device 102 such as IMUs or image sensors can detect a physical interaction (e.g., bump) or physical proximity (e.g., camera field of view) with a second electronic device. This information can be used in conjunction with communications mechanisms such as NFC or UWB such that the devices can identify one another. For example, IMUs on first electronic device 102 and second electronic device 104 may detect acceleration representing a bump between the two devices and invoke a communication mechanism such as NFC for further device discovery and selection.

At block 215, the first electronic device 102 and the selected second electronic device 104 perform an authentication handshake. In some embodiments, the first electronic device 102 and the second electronic device 104 perform the authentication handshake in accordance with a determination that settings of the first electronic device 102 and second electronic device 104 allow the first electronic device 102 and second electronic device 104 to connect as described above. In some embodiments, performing the authentication handshake includes exchanging one or more cryptographic keys for authenticating the identification of the first electronic device 102 and/or second electronic device 104. In some embodiments, the authentication handshake includes the first electronic device 102 displaying an authentication token (e.g., a QR code or other image) and the second electronic device 104 capturing an image of the authentication token. In some embodiments, the authentication handshake includes the second electronic device 104 displaying the authentication token and the first electronic device 102 capturing an image of the authentication token. In some embodiments, the first electronic device 102 or the second electronic device 104 displays a code for connecting the devices and the user of the other device enters the code into a user interface displayed using the other of the first electronic device 102 or the second electronic device 104 as part of performing the authentication handshake. In some embodiments, if the first electronic device 102 and second electronic device 104 have connected previously and/or if the second electronic device 104 is storing data of the first electronic device 102, as described in more detail below, when the authentication handshake is to be performed, the first electronic device 102 and second electronic device 104 perform an abbreviated handshake. For example, if the first electronic device 102 and second electronic device 104 have previously connected, the authentication handshake can omit display of the authentication token and/or the exchange of one or more cryptographic keys.

At block 220, the first electronic device 102 transmits data to the second electronic device 104. In some embodiments, the data includes data stored in the file system of the first electronic device 102. As described above, in some embodiments, the first electronic device 102 directly transfers the data to the second electronic device 104 without using a server or other third electronic device as an intermediary. For example, the first electronic device 102 transmits the data to the second electronic device 104 using a single-hop, peer-to-peer communication, such as Bluetooth or WiFi Direct. In some embodiments, the data includes productivity files (e.g., documents), photos, videos, audio, and device configuration data (e.g., customizations, preferences, accessibility settings, and/or other settings), files, user account login information, and/or a representation of the user (e.g., avatar). For example, device configuration data includes data customized to the user of the first electronic device 102 that the second electronic device 104 uses to enable efficient, customized control of the second electronic device 104. For example, if the second electronic device 104 includes a password management program that unlocks access to passwords based on user fingerprints and/or an image of the user's face, the device configuration data includes the fingerprint data and/or face data that enables the user to use the password manager on the second electronic device 104 securely and efficiently. As another example, when the second electronic device 104 is a wearable device, such as a head-mounted display, the device configuration data includes sensor calibration data that enables the second electronic device 104 to accurately receive inputs provided by the user of the first electronic device while using the second electronic device 104. In some embodiments, the first electronic device 102 transfers the device configuration data to the second electronic device 104 before transferring other data to enable the user of the first electronic device 102 to start using the device configuration data on the second electronic device 104 while the first electronic device 102 continues to transfer other portions of the data to the second electronic device 104.

At block 225, the second electronic device 104 creates the temporary file system for storing data received from first electronic device 102. Importantly, the temporary file system is logically and/or physically separated from other files stored on second electronic device 104 such that other users of second electronic device 104 cannot access the contents of the temporary system. The temporary file system can be implemented logically and/or physically in various manners. In some examples, the temporary file system is a dedicated branch off of an existing file system on electronic device 104. In some examples, the temporary file system shares a file volume with other file systems of second electronic device 104, but is stored as a file system that is logically separate from those other file systems on the volume. In some examples, the temporary file system is stored on a different volume. As can be appreciated, various volumes can be logical or physical, and can span one or more underlying logical or physical storage media. Second electronic device 104 maintains files in the temporary file system such that they are not accessible to other users of second electronic device 104.

In some embodiments, data in the temporary file system, which are received from the first electronic device 102, are encrypted to protect privacy and data security of the user of the first electronic device 102. For example, the files can be encrypted using a private key of the first electronic device 102 prior to transmission to second electronic device 104. As such, the data stored in the temporary file system are not accessible to users of second electronic device 104 without access to a decryption key.

Optionally, at block 230, the second electronic device 104 operates using the temporary file system that includes first data from the first electronic device 102. As described herein, the second electronic device 104 optionally operates using the temporary file system for a period of time and, at the conclusion of use deletes at least portion of the temporary file system.

In some embodiments, while operating using the temporary file system, the second electronic device 104 accesses the first data provided by the first electronic device 102. For example, the second electronic device 104 uses device configuration data (e.g., customizations, preferences, accessibility settings, and/or other settings) of the first user to configure second electronic device 104 for the first user. Using device configuration data allows the first user to start using the second electronic device 104 while other data of the first user progressively downloads (e.g., while operating using the temporary file system, the second electronic device 104 can continue to receive additional data transferred from the first electronic device 102. In other words, the transfer of data can prioritize some data for initial transfer to be used to enable operation at the second electronic device 104, whereas other data not required initially to enable operation at the second electronic device 104 can be subsequently transferred. In some embodiments, the transfer of data prioritizes preselected data, such as data stored in a designated folder on the first electronic device 102. In some embodiments, transfer of data automatically prioritizes certain device configuration data necessary to operate the second electronic device 104.

To the extent that data or files in the temporary file system are updated during use of the second electronic device 104 (e.g., in response to user inputs making changes to the file at the second electronic device 104), the updates are optionally propagated to the first electronic device 102 and/or transferred to a cloud storage account associated with the first electronic device 102.

In some embodiments, the second electronic device 104 operates using the temporary file system containing the first data until one or more criteria are satisfied. When the one or more criteria are satisfied, the second electronic device 104 stops operating using the temporary file system as described herein (e.g., deleting the temporary file system from the second electronic device 104). The one or more criteria optionally include a distance based criterion. For example, the distance criterion is satisfied when detecting the first electronic device 102 moves at least a threshold distance (e.g., 1, 2, 3, 5, 10, 20, 30, 50, 100, and/or 500 meters) away from the second electronic device 104. In some embodiments, the threshold distance corresponds to the maximum range of a particular communication protocol in use between the first electronic device 102 and the second electronic device 104. The one or more criteria optionally include a communication based criterion. For example, the communication based criterion is satisfied when detecting the first electronic device does not share a communication channel with the second electronic device (e.g., first electronic device 102 leaves the WiFi network to which electronic device 104 is connected or otherwise loses a peer-to-peer connection, etc.). The one or more criteria optionally include a time based criterion. For example, the time criterion is satisfied when detecting the second electronic device 104 is not used by the user of the first electronic device 102 for a predetermined time threshold (e.g., 30 seconds, 1, 2, 5, 10, 15, or 30 minutes). The one or more criteria optionally include a user input based criterion. For example, the user input criterion is satisfied when receiving a user input (e.g., from the first user) requesting to sign out of the first user account (e.g., guest account) on the second electronic device 104. Additionally or alternatively, the user input criterion is satisfied when receiving an indication from the first electronic device 102 indicating that the second electronic device 104 should cease operating using the temporary file system. The one or more criteria optionally include a subset or all of the aforementioned criteria. In some embodiments, some of the aforementioned criteria are combined. For example, the one or more criteria optionally include a distance and time based criterion that is satisfied when detecting first electronic device moves the threshold distance for more than then the predetermined time threshold.

At block 235, the second electronic device 104 deletes at least a portion of the temporary file system and/or at least a portion of the data from the second electronic device 104 in accordance with the above described criteria. In some embodiments, the second electronic device 104 deletes the entire temporary file system and/or all of the data received from the first electronic device 102 when the one or more criteria are satisfied. Deleting the data of the user of the first electronic device 102 from the second electronic device 104 can provide privacy protection and data security of the user of the first electronic device 102. In some embodiments, the second electronic device 104 deletes a portion of the temporary file system and/or a portion of the data received from the first electronic device 102 when the one or more criteria are satisfied, but some type of data are retained for a longer duration. For example, the second electronic device 104 optionally deletes one or more files, media, photos, or applications associated with the user account of the first electronic device 102, but retains metadata that allows the second electronic device 104 to remember the authenticated status of the first electronic device 102 and/or device configuration data that allows a user associated with the first electronic device to re-log-in to the second electronic device (e.g., allowing for faster log-in). In some embodiments, some types of files are retained for a longer duration, as compared with another type of file (e.g., photos are retained for a longer duration than productivity files). In some embodiments, files that have been edited on the second electronic device 104 are retained until the changes have been propagated to the user's devices (e.g., first electronic device 102). Implementers are reminded that file system deletion settings should be performed consistent with users' preferences as specified on the first and/or second electronic devices.

It is understood that the operations shown in method 200 of FIG. 2A are only illustrative and that some operations may be modified or omitted, additional operations may be added, and the order of certain operations may be altered.

Figure 2B:
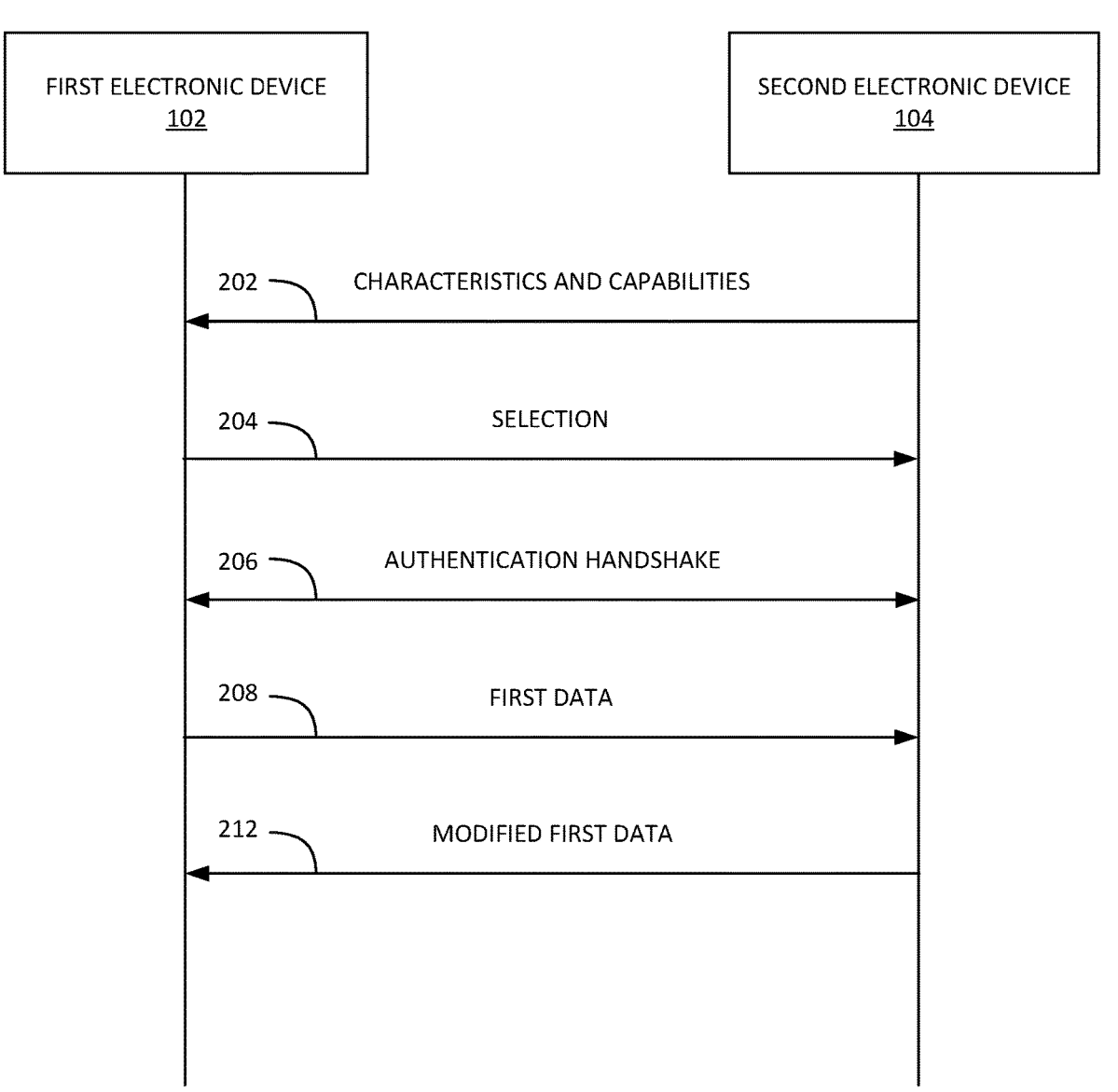
FIG. 2B is a data flow diagram illustrating example communications between a first electronic device and a second electronic device according to some embodiments of the disclosure.

FIG. 2B is a data flow diagram illustrating example communications between the first electronic device 102 and the second electronic device 104 according to some embodiments of the disclosure (e.g., while performing method 200 of FIG. 2A). Communications between the first electronic device 102 and the second electronic device 104 are indicated with arrows. Communications traffic indicated by arrow 202 from the second electronic device 104 to the first electronic device 102 is a transfer of characteristics and capabilities of the second electronic device 104 corresponding to the operation at block 205 of FIG. 2A (e.g., broadcasting as part of device discovery). Communications traffic indicated by arrow 204 from the first electronic device 102 to the second electronic device 104 is an indication of selection of the second electronic device 104 corresponding to operation at block 210 of FIG. 2A. Bidirectional communications traffic indicated by arrow 206 between the first electronic device 102 and the second electronic device 104 indicates an exchange of data as part of an authentication handshake corresponding to operation at block 215 of FIG. 2A. Communications traffic indicated by arrow 208 from the first electronic device 102 to the second electronic device 104 is a transfer of first data to the second electronic device 104 corresponding to operation at block 220 (e.g., optionally a progressive transfer that continues during operations at block 225 and/or block 230). Communications traffic indicated by arrow 212 from the second electronic device 104 to the first electronic device 102 is a transfer of modified first data from the second electronic device 104 to the first electronic device 102 and/or to a cloud storage server. It is understood that although unidirectional arrows are shown for some communication traffic and bidirectional arrows are shown for other communication traffic, that the communications between the devices are not limited by these directional indications.

In some embodiments, method 200 enables the second electronic device 104 to provide a customized experience to the user of the first electronic device 102 by operating with files from the first electronic device 102 on a secure and temporary basis. Many operations of method 200 are performed by the first electronic device 102 and second electronic device 104 automatically to create a seamless user experience. For example, the user of the first electronic device 102 can bring the first electronic device 102 into proximity of the second electronic device 104, such as touching the first electronic device 102 to the second electronic device 104 as described above, and, once the second electronic device 104 receives at least a portion of the user data from the first electronic device 102, the second electronic device 104 is configured for the user of first electronic device 102 and/or the user of the first electronic device 102 is able to access the user data on the second electronic device 104.

Figure 3:
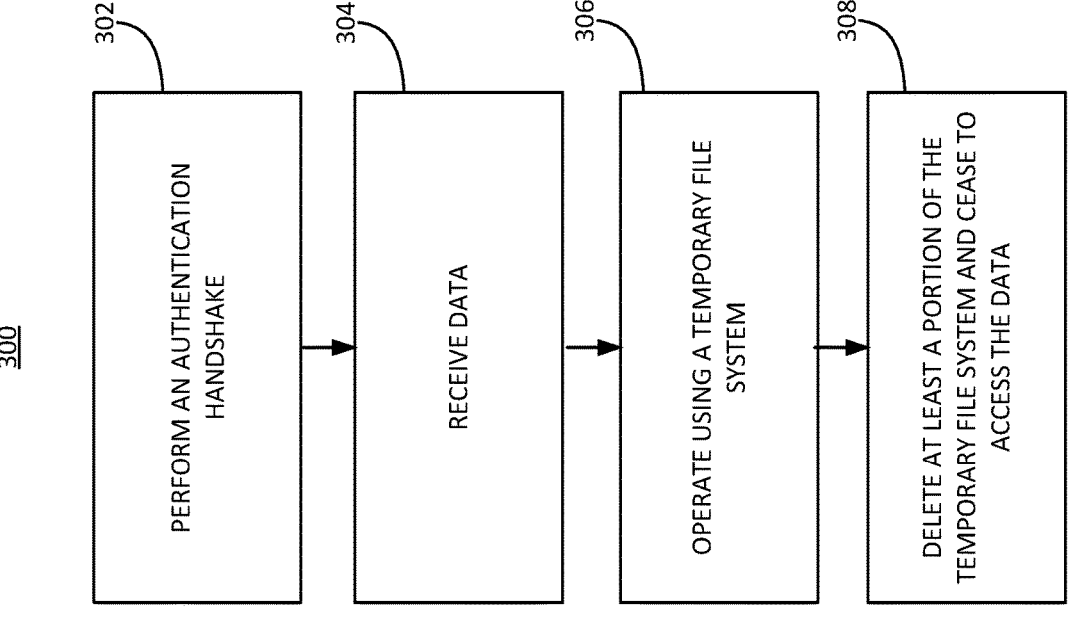
FIG. 3 is a flow chart of an example method according to some embodiments of the disclosure.

FIG. 3 is a flow chart of an example method 300 according to some embodiments of the disclosure. In some embodiments, method 300 is performed at the second electronic device 104 described above with reference to FIGS. 1 through 2B.

In some embodiments, at block 302, the second electronic device 104 performs an authentication handshake with the first electronic device 102. In some embodiments, at block 304, the second electronic device 104 receives data. For example, the second electronic device 104 receives first data from the first electronic device 102. In some embodiments, at block 306, the second electronic device 104 operates using a temporary file system. In some embodiments, the temporary file system includes the first data received from the first electronic device 102. In some embodiments, at block 308, the second electronic device 104 deletes at least a portion of the temporary file system and ceases to access the first data. In some embodiments, the second electronic device 104 deletes at least the portion of the temporary file system in response to one or more criteria being satisfied.

In some embodiments, the operations of method 300 include one or more of the details described above with reference to FIG. 2. In some embodiments, the first electronic device 102 performs method 400 described below with reference to FIG. 4 while the second electronic device 104 performs method 300. One or more operations of method 300 can be skipped, repeated, performed in an alternative order to the order in which the operations were described, and/or modified in some embodiments without departing from the scope of the disclosure.

Figure 4:
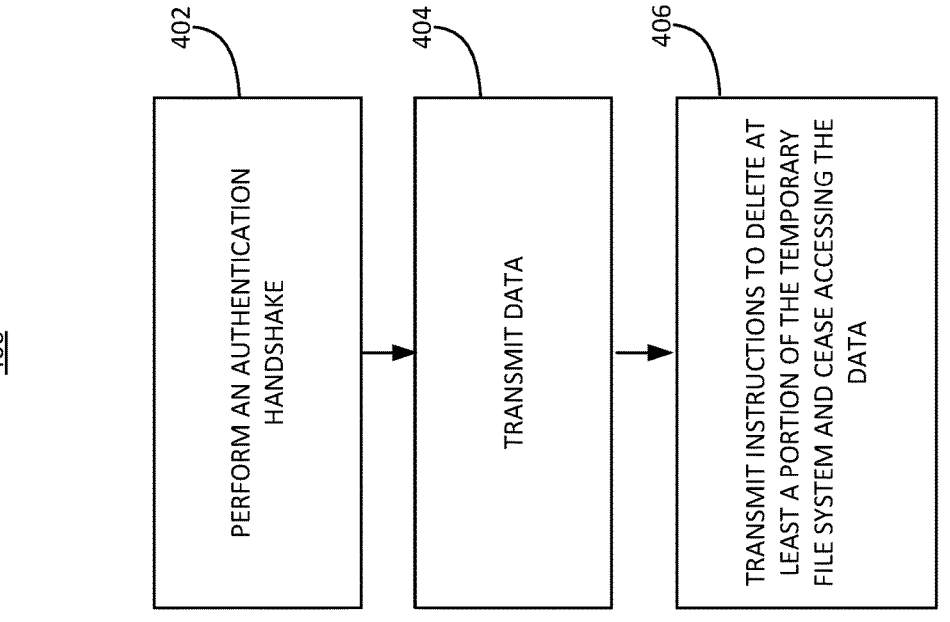
FIG. 4 is a flow chart of an example method according to some embodiments of the disclosure.

FIG. 4 is a flow chart of an example method 400 according to some embodiments of the disclosure. In some embodiments, method 400 is performed at the first electronic device 102 described above with reference to FIGS. 1-2B.

In some embodiments, at block 402, the first electronic device 102 performs an authentication handshake with the second electronic device 104. In some embodiments, at block 404, the first electronic device 102 transmits data. For example, the first electronic device 102 transmits first data to the second electronic device 104. In some embodiments, after the first electronic device 102 transmits the first data to the second electronic device 104, the second electronic device 104 operates using a temporary file system including the first data as described in more detail above with reference to FIGS. 1-3. In some embodiments, at block 406, the first electronic device 102 transmits instructions to the second electronic device 104 to delete at least a portion of the temporary file system and to cease to access the first data.

In some embodiments, the operations of method 400 include one or more of the details described above with reference to FIGS. 2A-2B. In some embodiments, the first electronic device 102 performs method 400 while the second electronic device 104 performs method 300 described above with reference to FIG. 3. One or more operations of method 400 can be skipped, repeated, performed in an alternative order to the order in which the operations were described, and/or modified in some embodiments without departing from the scope of the disclosure.

Figure 5:
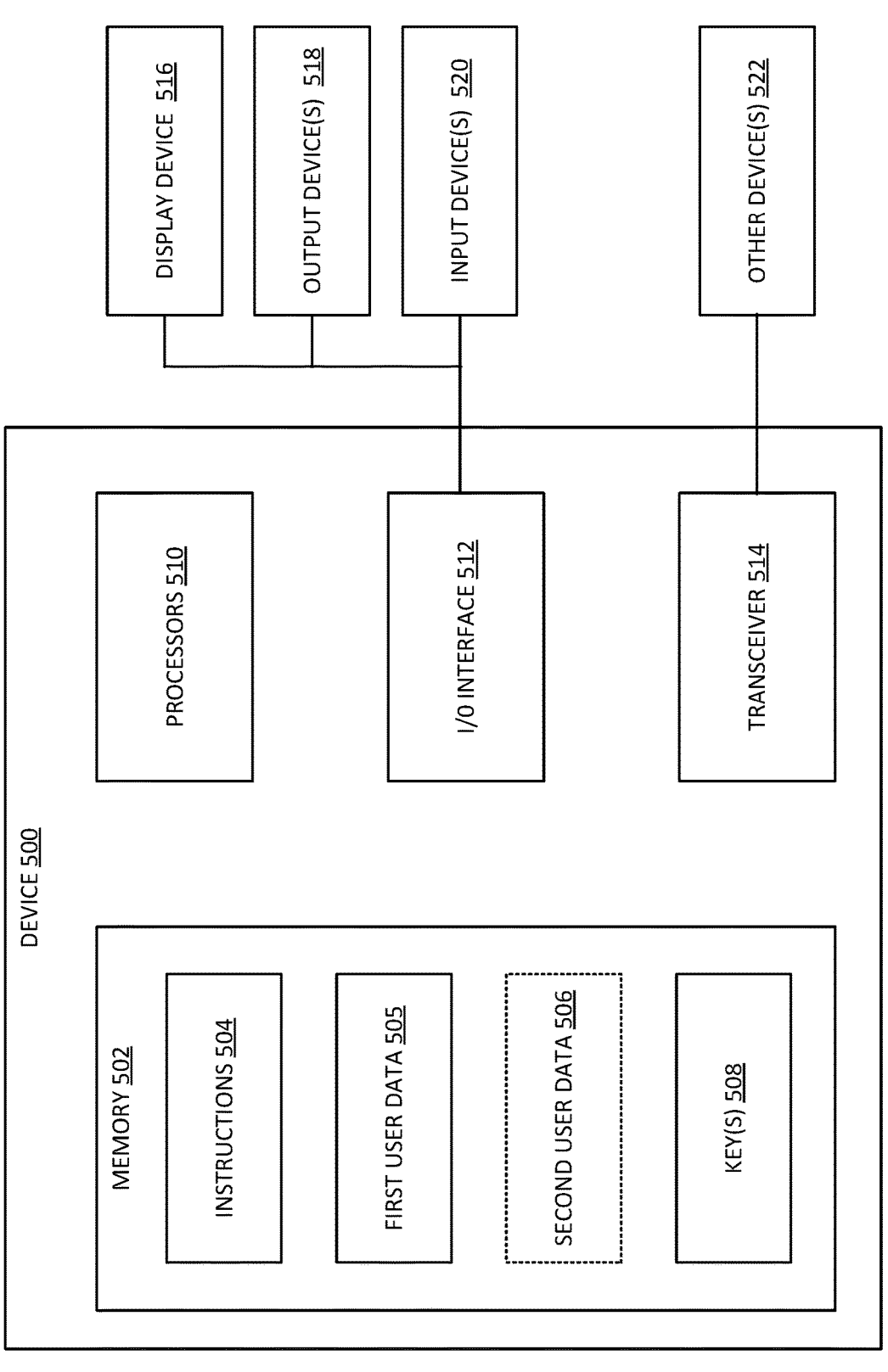
FIG. 5 is a block diagram of an example electronic device according to some embodiments of the disclosure.

FIG. 5 is an example block diagram of an electronic device 500 according to some embodiments of the disclosure. In some embodiments, the electronic device 500 includes memory 502, one or more processors 510, an I/O interface 512, and a transceiver 514. In some embodiments, the electronic device 500 includes additional or alternative components. In some embodiments, first electronic device 102 and/or second electronic device 104 are of the same architecture as electronic device 500. In some embodiments, first electronic device 102 and/or second electronic device 104 include more, fewer, or different components than shown in the architecture as electronic device 500.

In some embodiments, memory 502 of electronic device 500 includes volatile and/or non-volatile memory implemented using electronic, electromagnetic, magnetic, infrared, optical, and/or semiconductor system(s) and/or device(s). Examples of suitable memory circuitry include random access memory (RAM) devices (e.g., static random-access memory (SRAM), double-data-rate random-access memory (DDR RAM), dynamic random-access memory (DRAM), or other high-speed RAM or solid-state RAM, etc.), flash memory devices, read-only memory (ROM) devices, or erasable or electrically erasable programmable read-only memory devices (EPROM or EEPROM). Other types of memory are possible in some embodiments. In some embodiments, memory 502 can be separate from the one or more other components of electronic device 500 and electrically coupled to the one or more other components of electronic device 500 for read and/or write operations. In some embodiments, some of memory 502 can be integrated within other components of electronic device 500.

In some embodiments, at least a portion of the memory 502 can be referred as a computer-readable storage medium.

Memory 502 and/or a transitory or non-transitory computer readable storage medium of memory 502 can store instructions, programs, data structures and/or modules or a subset or combination thereof in some embodiments. In some embodiments, memory 502 and/or the computer readable storage medium can store instructions 504 and/or programs, which when executed by processors 510, can cause the electronic device 500 (or a computing system more generally) to perform one or more functions and methods of one or more examples of this disclosure, such as one or more of the methods described above with reference to FIGS. 1 through 4. As used herein, a "non-transitory computer-readable storage medium" includes any tangible medium (e.g., excluding signals) that can contain or store programs/instructions for use by the electronic device (e.g., processing circuitry), for example.

As shown in FIG. 5, additionally or alternatively, the memory 502 of electronic device 500 stores first user data 505, second user data 506, and one or more keys 508. In some embodiments, the first user data 505 includes user data associated with a first user account into which the electronic device 500 is signed in. For example, signing into the first user account enables a user to use the electronic device 500 to access files, programs, communication accounts (e.g., e-mail accounts or other messaging accounts), and/or other data private to the user account and enables the electronic device 500 to operate according to settings selected by a user and saved to the first user account. In some embodiments, the electronic device 500 stores the first user data 505 using a file system. In some embodiments, the file system includes data structures for storing, retrieving, and/or identifying various data stored in memory 502 on the electronic device 500.

As described in more detail above with reference to FIGS. 1-4, in some embodiments, the electronic device 500 receives the second user data 506 from a second electronic device (e.g., optionally included in the other device(s) 522 in communication with electronic device 500) and stores the second user data 506 in a temporary file system. In some embodiments, the second user data is associated with a user account of one or more of the other device(s) 522. In some embodiments, the temporary file system includes data structures for storing, retrieving, and/or identifying the second user data 506. In some embodiments, the temporary file system storing the second user data 506 is separate from the file system that includes the first user data 505. In some embodiments, the separating the temporary file system storing the second user data 506 includes storing the temporary file system storing the second user data 506 on a different volume than the file system that includes the first user data 505. In some embodiments, the separating the temporary file system storing the second user data 506 includes storing the temporary file system storing the second user data 506 on a different hard disk than the file system that includes the first user data 505.

As shown in FIG. 5, in some embodiments, memory 502 stores one or more keys 508. In some embodiments, the keys 508 include private keys for encrypting and accessing user data. For example, the electronic device 500 stores one or more private keys that encrypt the first user data 505. In some embodiments, a second electronic device that provided the second user data 506 stores one or more keys that encrypt the second user data 506 and are used to access the second user data 506. For example, the electronic device 500 is able to access the second user data 506 after the second electronic device decrypts the second user data 506 using one or more private keys. In this example, the second electronic device is able to encrypt the second user data 506 to prevent the electronic device 500 from continuing to access the second user data 506 without the second electronic device providing the key and/or decrypting the data. In some embodiments, the electronic device 500 does not store the private key for decrypting the second user data 506 in the same volume as the key for decrypting the first user data 505. For example, the electronic device 500 stores the key for decrypting the second user data 506 in the temporary file system that stores the second user data 506 to enable the electronic device 500 to access the second user data 506 temporarily while authorized to do so by the second electronic device.

In some embodiments, the electronic device 500 further includes one or more processors 510. Processors 510 can include graphics processing units (GPUs), central processing units (CPUs), microprocessors, microcontrollers, programmable logic device (PLD), field-programmable gate arrays (FPGAs), application specific integrated circuits (ASICs), digital signal processors (DSPs), or any suitable processing circuitry. The electronic device 500 can use processors 510 to perform any of the functions, processes, and/or methods described herein (e.g., optionally by executing instructions or programs stored in memory 502 and/or a non-transitory computer-readable storage medium).

In some embodiments, the electronic device 500 further includes an I/O interface 512. I/O interface 512 includes circuitry such as data lines, address lines, and control lines, for example, that enable communication between the electronic device 500 and one or more peripherals, such as display device 516, output device(s) 518, and input device(s) 520. Example display devices include, but are not limited to, monitors, television screens, touch screens, projectors, and/or head mounted displays implemented with LCD (liquid crystal display), LED (light emitting diode), OLED (organic light emitting diode), and/or other technology. Examples of other output device(s) 518 include, but are not limited to audio output devices (e.g., wired and/or wireless speakers and/or headphones), tactile output devices (e.g., haptic and/or vibration devices), and other visual output devices (e.g., indicator lights). Example input device(s) 520 include camera(s) (e.g., visible light cameras and/or infrared cameras), depth sensors (e.g., range sensors and/or LiDAR), trackpads, mouses, touch screens, microphones, keyboards, pedals, remote controls, and/or video game controllers.

In some embodiments, the electronic device 500 includes a transceiver 514. Transceiver 514 includes transmitter and/or receiver circuitry, including but not limited to signal generator(s), oscillator(s), modulator(s), encoder(s), amplifier(s), antenna(s), demodulator(s), filter(s), decoder(s), and/or tuner(s), for example. In some embodiments, the transceiver 514 is configured to communicate with other device(s) 522 (e.g., including the second electronic device described above with reference to FIGS. 1-4) using one or more protocols, including but not limited to, Bluetooth, Wi-Fi, WiFi Direct, radio, cellular communication, satellite communication, and/or wired communication.

As described above, the components and configuration of components of electronic device 500 according to the disclosure are not limited by the example illustrated and described with reference to FIG. 5. In some embodiments, one or more of the components of the electronic device 500 included in FIG. 5 and any additional components of the electronic device 500 not shown in FIG. 5 are in communication with each other and/or integrated with each other. In some embodiments, additional or alternative components and/or configurations are possible.

Some embodiments are directed to an electronic device comprising memory storing first user data associated with a first user account; and one or more processors coupled to the memory, the one or more processors configured to perform an authentication handshake with a second electronic device associated with a second user account different from the first user account after performing the authentication handshake with the second electronic device, receive, from the second electronic device, second user data associated with the second user account; in response to receiving the second user data from the second electronic device, operate using a temporary file system that stores the second user data; and in accordance with one or more criteria being satisfied, delete at least a portion of the temporary file system and cease to access the second user data. Additionally or alternatively, in some embodiments performing the authentication handshake with the second electronic device includes capturing, using a camera in communication with the electronic device, an image including an authentication token displayed using a display generation component in communication with the second electronic device. Additionally or alternatively, in some embodiments operating using the temporary file system is in accordance with a determination that a security setting of the electronic device allows operating using the temporary file system that includes the second user data received from the second electronic device, and the one or more processors are further configured to in accordance with a determination that the security setting of the second electronic device prohibits operating using a second temporary file system that includes third user data associated with a third electronic device, preventing operation using the second temporary file system. Additionally or alternatively, in some embodiments receiving the second user data from the second electronic device includes directly receiving the first user data from the second electronic without using a third electronic device to facilitate transfer of the first user data. Additionally or alternatively, in some embodiments receiving the first user data from the second electronic device includes receiving a first portion of the second user data from the second electronic device before receiving a second portion of the second user data from the second electronic device, and the one or more processors are further configured to, in response to receiving the first portion of the second user data before receiving the second portion of the second user data, operate using a temporary file system that includes the first portion of the second user data without the second portion of the second user data. Additionally or alternatively, in some embodiments operating using the temporary file system includes signing into the first user account, and the one or more criteria include a criterion that is satisfied when the electronic device receives an input, using one or more input devices in communication with the electronic device, corresponding to a request to sign out of the first user account. Additionally or alternatively, in some embodiments the one or more criteria include a criterion that is satisfied when a distance between the electronic device and the second electronic device exceeds a predefined distance threshold. Additionally or alternatively, in some embodiments the one or more processors are further configured to, in accordance with the one or more criteria being satisfied, forgoing deleting a second portion of the temporary file system and encrypting the second portion of the temporary file system with a key stored in second memory of the second electronic device. Additionally or alternatively, in some embodiments the second user data includes a model of a second user associated with the second user account, and operating using the temporary file system includes receiving user inputs in response to sensing movement of the second user. Additionally or alternatively, in some embodiments receiving the second user data from the second electronic device using the one or more processors includes: in accordance with a determination that a first portion of the second user data is stored in the memory, receiving a second portion of the second user data, different from the first portion of the second user data, from the second electronic device without receiving the first portion of the second user data from the second electronic device, and in accordance with a determination that the first portion of the second user data is not stored in the memory, receiving the first portion of the second user data and the second portion of the second user data from the second electronic device. Additionally or alternatively, in some embodiments performing the authentication handshake with the second electronic device using the one or more processors includes: in accordance with a determination that a portion of the second user data is stored in the memory, performing a first portion of the authentication handshake without performing a second portion of the authentication handshake, and in accordance with a determination that the portion of the second user data is not stored in the memory, performing the first portion of the authentication handshake and the second portion of the authentication handshake. Additionally or alternatively, in some embodiments the electronic device stores the first user data using a first volume and stores the second user data using a second volume different from the first volume. Additionally or alternatively, in some embodiments the second user data includes a second user profile of the second user account. Additionally or alternatively, in some embodiments the first user data is encrypted with a first key associated with the first user account and the second user data is encrypted with a second key different from the first key associated with the second user account. Additionally or alternatively, in some embodiments the one or more processors are configured to, prior to receiving the second user data from the second electronic device, transmit one or more signals indicating respective of the electronic device.

Some embodiments are directed to a method performed at an electronic device including memory storing first user data associated with a first user account and one or more processors coupled to the memory, the method comprising: performing an authentication handshake with a second electronic device associated with a second user account different from the first user account; after performing the authentication handshake with the second electronic device, receiving, from the second electronic device, second user data associated with the second user account; in response to receiving the second user data from the second electronic device, operating using a temporary file system that stores the second user data; and in accordance with one or more criteria being satisfied, deleting at least a portion of the temporary file system and ceasing to access the second user data.

Some embodiments are directed to a non-transitory computer readable storage medium storing instructions that, when executed at an electronic device including memory storing first user data associated with a first user account and one or more processors coupled to the memory, causes the electronic device to perform an authentication handshake with a second electronic device associated with a second user account different from the first user account, after performing the authentication handshake with the second electronic device, receive, from the second electronic device, second user data associated with the second user account; in response to receiving the second user data from the second electronic device, operate using a temporary file system that stores the second user data; and in accordance with one or more criteria being satisfied, delete at least a portion of the temporary file system and cease to access the second user data.

Some embodiments are directed to a system comprising: a first electronic device including first memory storing first user data associated with a first user account and one or more first processors coupled to the first memory; a second electronic device including second memory storing second user data different from the first user data associated with a second user account different from the first user account and one or more second processors coupled to the second memory, wherein: the one or more first processors are configured to: perform an authentication handshake with the second electronic device, and after performing the authentication handshake with the second electronic device, transmit, to the second electronic device, the first user data, and the one or more second processors are configured to: in response to receiving the first user data from the first electronic device, operate using a temporary file system that includes the first user data; and in accordance with one or more criteria being satisfied, delete at least a portion of the temporary file system and cease to access the first user data. Additionally or alternatively, in some embodiments performing the authentication handshake includes: displaying, using a display device in communication with one of the first electronic device or the second electronic device, an authentication token, and capturing, using a camera in communication with another of the first electronic device or the second electronic device, an image including the authentication token. Additionally or alternatively, in some embodiments operating using the temporary file system at the second electronic device is in accordance with a determination that a security setting of the second electronic device allows operating using the temporary file system that includes the first user data received from the first electronic device, and the one or more second processors are further configured to: in accordance with a determination that the security setting of the second electronic device prohibits operating using a second temporary file system that includes third user data associated with a third electronic device, preventing operation using the second temporary file system. Additionally or alternatively, in some embodiments transmitting the first user data to the second electronic device using the one or more first processors of the first electronic device includes directly transmitting the first user data from the first electronic device to the second electronic device without using a third electronic device to facilitate transfer of the first user data. Additionally or alternatively, in some embodiments transmitting the first user data to the second electronic device using the one or more first processors includes transmitting a first portion of the first user data to the second electronic device before transmitting a second portion of the first user data to the second electronic device, and the one or more second processors are further configured to, in response to receiving the first portion of the first user data before receiving the second portion of the first user data, operate using a temporary file system that includes the first portion of the first user data without the second portion of the first user data. Additionally or alternatively, in some embodiments operating using the temporary file system includes signing into the first user account, and the one or more criteria include a criterion that is satisfied when the second electronic device receives an input, using one or more input devices in communication with the second electronic device, corresponding to a request to sign out of the first user account. Additionally or alternatively, in some embodiments the one or more criteria include a criterion that is satisfied when a distance between the first electronic device and the second electronic device exceeds a predefined distance threshold. Additionally or alternatively, in some embodiments the one or more second processors are further configured to: in accordance with the one or more criteria being satisfied, forgoing deleting a second portion of the temporary file system and encrypting the second portion of the temporary file system with a key stored in the first memory. Additionally or alternatively, in some embodiments the first user data includes a model of a first user associated with the first user account, and operating using the temporary file system includes receiving user inputs in response to sensing movement of the first user. Additionally or alternatively, in some embodiments transmitting the first user data to the second electronic device using the one or more first processors includes: in accordance with a determination that a first portion of the first user data is stored in the second memory, transmitting a second portion of the first user data, different from the first portion of the first user data, to the second electronic device without transmitting the first portion of the first user data to the second electronic device, and in accordance with a determination that the first portion of the first user data is not stored in the second memory, transmitting the first portion of the first user data and the second portion of the first user data to the second electronic device. Additionally or alternatively, in some embodiments performing the authentication handshake with the second electronic device using the one or more first processors includes: in accordance with a determination that a portion of the first user data is stored in the second memory, performing a first portion of the authentication handshake without performing a second portion of the authentication handshake, and in accordance with a determination that the portion of the first user data is not stored in the second memory, performing the first portion of the authentication handshake and the second portion of the authentication handshake. Additionally or alternatively, in some embodiments the second electronic device stores the first user data using a first volume and stores the second user data using a second volume different from the first volume. Additionally or alternatively, in some embodiments the first user data includes a first user profile of the first user account. Additionally or alternatively, in some embodiments the first user data is encrypted with a first key associated with the first user account and the second user data is encrypted with a second key different from the first key associated with the second user account. Additionally or alternatively, in some embodiments the one or more first processors are configured to: receive signals from a plurality of electronic devices indicating respective capabilities of the electronic devices, and wherein performing the authentication handshake with the second electronic device includes selecting the second electronic device from the plurality of electronic devices based on the received signals.

Some embodiments are directed to a method performed at a system that includes a first electronic device including first memory storing first user data associated with a first user account and one or more first processors coupled to the first memory and a second electronic device including second memory storing second user data different from the first user data associated with a second user account different from the first user account and one or more second processors coupled to the second memory, the method comprising: at the first electronic device: performing an authentication handshake with the second electronic device, and after performing the authentication handshake with the second electronic device, transmitting, to the second electronic device, the first user data, and at the second electronic device: in response to receiving the first user data from the first electronic device, operating using a temporary file system that includes the first user data; and in accordance with one or more criteria being satisfied, deleting at least a portion of the temporary file system and ceasing to access the first user data.

Some embodiments are directed to a non-transitory computer readable storage system storing instructions that, when executed at a system that includes a first electronic device including first memory storing first user data associated with a first user account and one or more first processors coupled to the first memory and a second electronic device including second memory storing second user data different from the first user data associated with a second user account different from the first user account and one or more second processors coupled to the second memory, cause the system to: at the first electronic device: perform an authentication handshake with the second electronic device, and after performing the authentication handshake with the second electronic device, transmitting, to the second electronic device, the first user data, and at the second electronic device: in response to receiving the first user data from the first electronic device, operating using a temporary file system that includes the first user data; and in accordance with one or more criteria being satisfied, deleting at least a portion of the temporary file system and ceasing to access the first user data.

Some embodiments are directed to an electronic device comprising: memory storing first user data associated with a first user account; and one or more processors coupled to the memory, the one or more processors configured to: perform an authentication handshake with a second electronic device associated with a second user account different from the first user account; after performing the authentication handshake with the second electronic device, transmit, to the second electronic device, the first user data, wherein transmitting the first user data to the second electronic device enables the second electronic device to operate using a temporary file system storing the first user data; and in accordance with one or more criteria being satisfied, transmit, to the second electronic device, instructions to delete at least a portion of the temporary file system and cease accessing the first user data. Additionally or alternatively, in some embodiments performing the authentication handshake includes displaying, using a display device in communication with the first electronic device, an authentication token. Additionally or alternatively, in some embodiments performing the authentication handshake with the second electronic device and transmitting the first user data to the second electronic device is in accordance with a determination that a security setting of the second electronic device allows operating using the temporary file system that includes the first user data received from the first electronic device, and the one or more processors are further configured to: in accordance with a determination that the security setting of the second electronic device prohibits operating using the temporary file system that includes the second user data, forgoing one or more of performing the authentication handshake with the second electronic device and transmitting the first user data to the second electronic device. Additionally or alternatively, in some embodiments transmitting the first user data to the second electronic device using the one or more processors of the first electronic device includes directly transmitting the first user data from the first electronic device to the second electronic device without using a third electronic device to facilitate transfer of the first user data. Additionally or alternatively, in some embodiments transmitting the first user data to the second electronic device using the one or more processors includes transmitting a first portion of the first user data to the second electronic device before transmitting a second portion of the first user data to the second electronic device, wherein receiving the first portion of the first user data before receiving the second portion of the first user data enables the second electronic device to operate using a temporary file system that includes the first portion of the first user data without the second portion of the first user data. Additionally or alternatively, in some embodiments the one or more criteria include a criterion that is satisfied when a distance between the first electronic device and the second electronic device exceeds a predefined distance threshold. Additionally or alternatively, in some embodiments the first user data includes a model of a first user associated with the first user account, and operating using the temporary file system includes receiving user inputs in response to sensing movement of the first user. Additionally or alternatively, in some embodiments transmitting the first user data to the second electronic device using the one or more processors includes: in accordance with a determination that a first portion of the first user data is stored in second memory of the second electronic device, transmitting a second portion of the first user data, different from the first portion of the first user data, to the second electronic device without transmitting the first portion of the first user data to the second electronic device, and in accordance with a determination that the first portion of the first user data is not stored in the second memory, transmitting the first portion of the first user data and the second portion of the first user data to the second electronic device. Additionally or alternatively, in some embodiments performing the authentication handshake with the second electronic device using the one or more processors includes: in accordance with a determination that a portion of the first user data is stored in second memory of the second electronic device, performing a first portion of the authentication handshake without performing a second portion of the authentication handshake, and in accordance with a determination that the portion of the first user data is not stored in the second memory, performing the first portion of the authentication handshake and the second portion of the authentication handshake. Additionally or alternatively, in some embodiments the first user data includes a first user profile of the first user account. Additionally or alternatively, in some embodiments the first user data is encrypted with a first key associated with the first user account stored in the memory. Additionally or alternatively, in some embodiments the one or more processors are configured to: receive signals from a plurality of electronic devices indicating respective capabilities of the electronic devices, and wherein performing the authentication handshake with the second electronic device includes selecting the second electronic device from the plurality of electronic devices based on the received signals.

Some embodiments are directed to a method performed at an electronic device that includes memory storing first user data associated with a first user account; and one or more processors coupled to the memory, the method comprising: performing an authentication handshake with a second electronic device associated with a second user account different from the first user account; after performing the authentication handshake with the second electronic device, transmitting, to the second electronic device, the first user data, wherein transmitting the first user data to the second electronic device enables the second electronic device to operate using a temporary file system storing the first user data; and in accordance with one or more criteria being satisfied, transmitting, to the second electronic device, instructions to delete at least a portion of the temporary file system and cease accessing the first user data.

While some embodiments of the disclosure are described herein, additional and alternative embodiments are possible. Example embodiments are provided in the drawings and detailed description and are illustrative in nature. Modifications to the example embodiments are possible without departing from the scope of the disclosure.

The invention claimed is:

1. An electronic device comprising:
memory storing first user data associated with a first user account in a first file system of the electronic device; and
one or more processors coupled to the memory, the one or more processors configured to:
perform an authentication handshake with a second electronic device associated with a second user account different from the first user account;
after performing the authentication handshake with the second electronic device, receive, from the second electronic device, second user data associated with the second user account;
in response to receiving the second user data from the second electronic device, operate using a temporary file system, separate from the first file system storing the first user data associated with the first user account, that stores the second user data associated with the second user account, wherein operating with the temporary file system includes signing into the first user account; and
in accordance with one or more criteria being satisfied, wherein the one or more criteria include a criterion that is satisfied when the electronic device receives an input, using one or more input devices in communication with the electronic device, corresponding to a request to sign out of the first user account, delete at least a portion of the temporary file system and cease to access the second user data.

2. The electronic device of claim 1, wherein performing the authentication handshake with the second electronic device includes capturing, using a camera in communication with the electronic device, an image including an authentication token displayed using a display generation component in communication with the second electronic device.

3. The electronic device of claim 1, wherein operating using the temporary file system is in accordance with a determination that a security setting of the electronic device allows operating using the temporary file system that includes the second user data received from the second electronic device, and the one or more processors are further configured to:
in accordance with a determination that the security setting of the electronic device prohibits operating using a second temporary file system that includes third user data associated with a third electronic device, prevent operation using the second temporary file system.

4. The electronic device of claim 1, wherein receiving the second user data from the second electronic device includes directly receiving the second user data from the second electronic without using a third electronic device to facilitate transfer of the first user data.

5. The electronic device of claim 1, wherein:
receiving the second user data from the second electronic device includes receiving a first portion of the second user data from the second electronic device before receiving a second portion of the second user data from the second electronic device, and
the one or more processors are further configured to, in response to receiving the first portion of the second user data before receiving the second portion of the second user data, operate using the temporary file system that includes the first portion of the second user data without the second portion of the second user data.

6. The electronic device of claim 1, wherein the one or more criteria include a criterion that is satisfied when a distance between the electronic device and the second electronic device exceeds a predefined distance threshold.

7. The electronic device of claim 1, wherein the one or more processors are further configured to:
in accordance with the one or more criteria being satisfied, forgo deleting a second portion of the temporary file system and encrypting the second portion of the temporary file system with a key stored in second memory of the second electronic device.

8. The electronic device of claim 1, wherein the second user data includes a model of a second user associated with the second user account, and operating using the temporary file system includes receiving user inputs in response to sensing movement of the second user.

9. The electronic device of claim 1, wherein receiving the second user data from the second electronic device using the one or more processors includes:
in accordance with a determination that a first portion of the second user data is stored in the memory, receiving a second portion of the second user data, different from the first portion of the second user data, from the second electronic device without receiving the first portion of the second user data from the second electronic device, and
in accordance with a determination that the first portion of the second user data is not stored in the memory, receiving the first portion of the second user data and the second portion of the second user data from the second electronic device.

10. The electronic device of claim 1, wherein performing the authentication handshake with the second electronic device using the one or more processors includes:
in accordance with a determination that a portion of the second user data is stored in the memory, performing a first portion of the authentication handshake without performing a second portion of the authentication handshake, and
in accordance with a determination that the portion of the second user data is not stored in the memory, performing the first portion of the authentication handshake and the second portion of the authentication handshake.

11. The electronic device of claim 1, wherein the electronic device stores the first user data using a first volume and stores the second user data using a second volume different from the first volume.

12. The electronic device of claim 1, wherein the second user data includes a second user profile of the second user account.

13. The electronic device of claim 1, wherein the first user data is encrypted with a first key associated with the first user account and the second user data is encrypted with a second key, different from the first key, associated with the second user account.

14. The electronic device of claim 1, wherein the one or more processors are configured to, prior to receiving the second user data from the second electronic device, transmit one or more signals indicating respective characteristics and capabilities of the electronic device.

15. The electronic device of claim 1, wherein the second user data associated with the second user account includes sensor calibration data for the electronic device to use to receive inputs while a second user of the second user account uses the electronic device.

16. A method performed at an electronic device including memory storing first user data associated with a first user account in a first file system of the electronic device and one or more processors coupled to the memory, the method comprising:

performing an authentication handshake with a second electronic device associated with a second user account different from the first user account;

after performing the authentication handshake with the second electronic device, receiving, from the second electronic device, second user data associated with the second user account;

in response to receiving the second user data from the second electronic device, operating using a temporary file system, separate from the first file system storing the first user data associated with the first user account, that stores the second user data associated with the second user account, wherein operating with the temporary file system includes signing into the first user account; and in accordance with one or more criteria being satisfied, wherein the one or more criteria include a criterion that is satisfied when the electronic device receives an input, using one or more input devices in communication with the electronic device, corresponding to a request to sign out of the first user account, deleting at least a portion of the temporary file system and ceasing to access the second user data.

17. A non-transitory computer readable storage medium storing instructions that, when executed at an electronic device including memory storing first user data associated with a first user account in a first file system of the electronic device and one or more processors coupled to the memory, causes the electronic device to:

perform an authentication handshake with a second electronic device associated with a second user account different from the first user account;

after performing the authentication handshake with the second electronic device, receive, from the second electronic device, second user data associated with the second user account;

in response to receiving the second user data from the second electronic device, operate using a temporary file system, separate from the first file system storing the first user data associated with the first user account, that stores the second user data associated with the second user account, wherein operating with the temporary file system includes signing into the first user account; and in accordance with one or more criteria being satisfied, wherein the one or more criteria include a criterion that is satisfied when the electronic device receives an input, using one or more input devices in communication with the electronic device, corresponding to a request to sign out of the first user account, delete at least a portion of the temporary file system and cease to access the second user data.

18. The non-transitory computer readable storage medium of claim 17, wherein the second user data includes a model of a second user associated with the second user account, and operating using the temporary file system includes receiving user inputs in response to sensing movement of the second user.

19. The non-transitory computer readable storage medium of claim 17, wherein receiving the second user data from the second electronic device includes:

in accordance with a determination that a first portion of the second user data is stored in the memory, receiving a second portion of the second user data, different from the first portion of the second user data, from the second electronic device without receiving the first portion of the second user data from the second electronic device, and in accordance with a determination that the first portion of the second user data is not stored in the memory, receiving the first portion of the second user data and the second portion of the second user data from the second electronic device.

20. The non-transitory computer readable storage medium of claim 17, wherein performing the authentication handshake with the second electronic device includes:

in accordance with a determination that a portion of the second user data is stored in the memory, performing a first portion of the authentication handshake without performing a second portion of the authentication handshake, and in accordance with a determination that the portion of the second user data is not stored in the memory, performing the first portion of the authentication handshake and the second portion of the authentication handshake.

* * * * *